United States Patent Office 3,516,742
Patented June 23, 1970

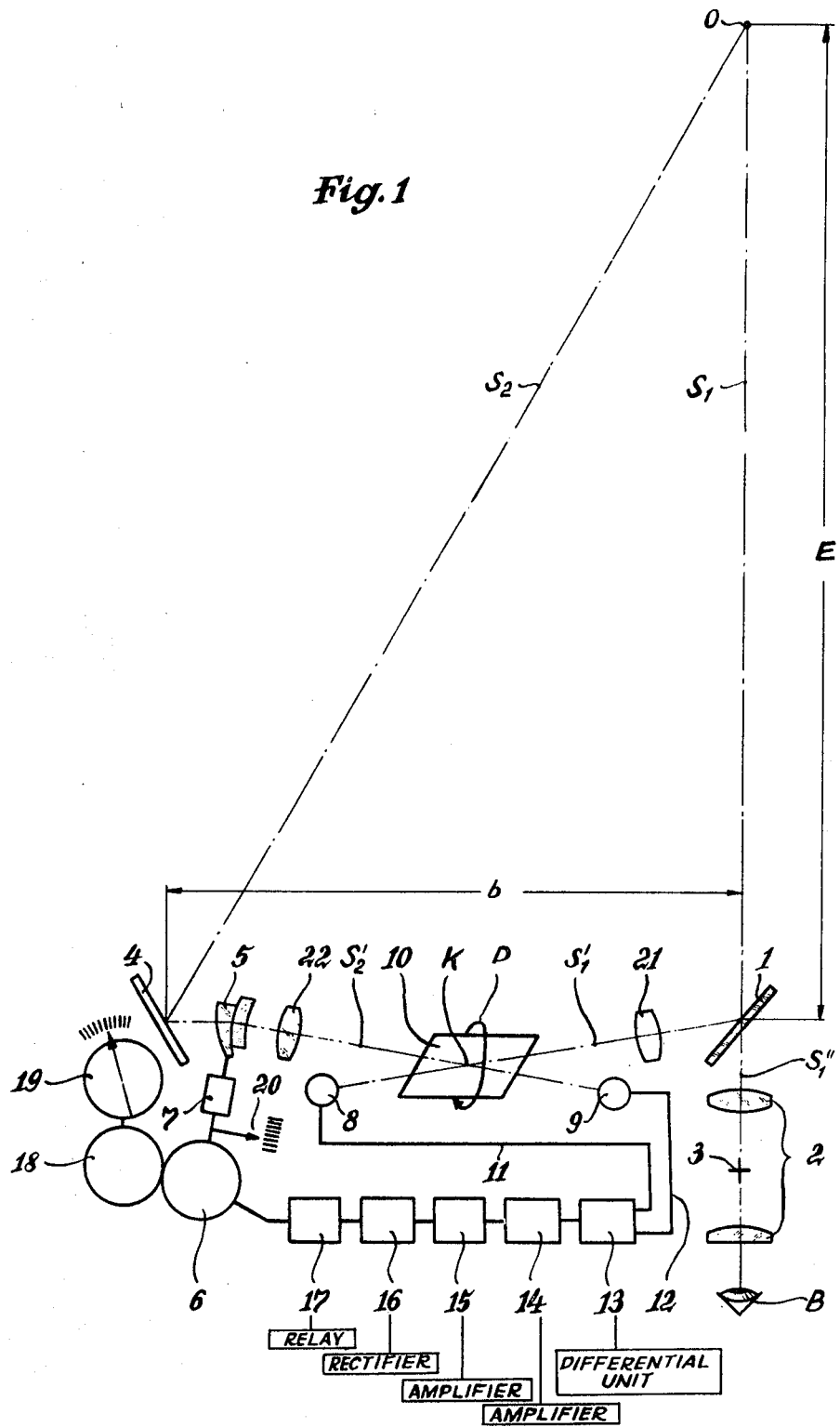

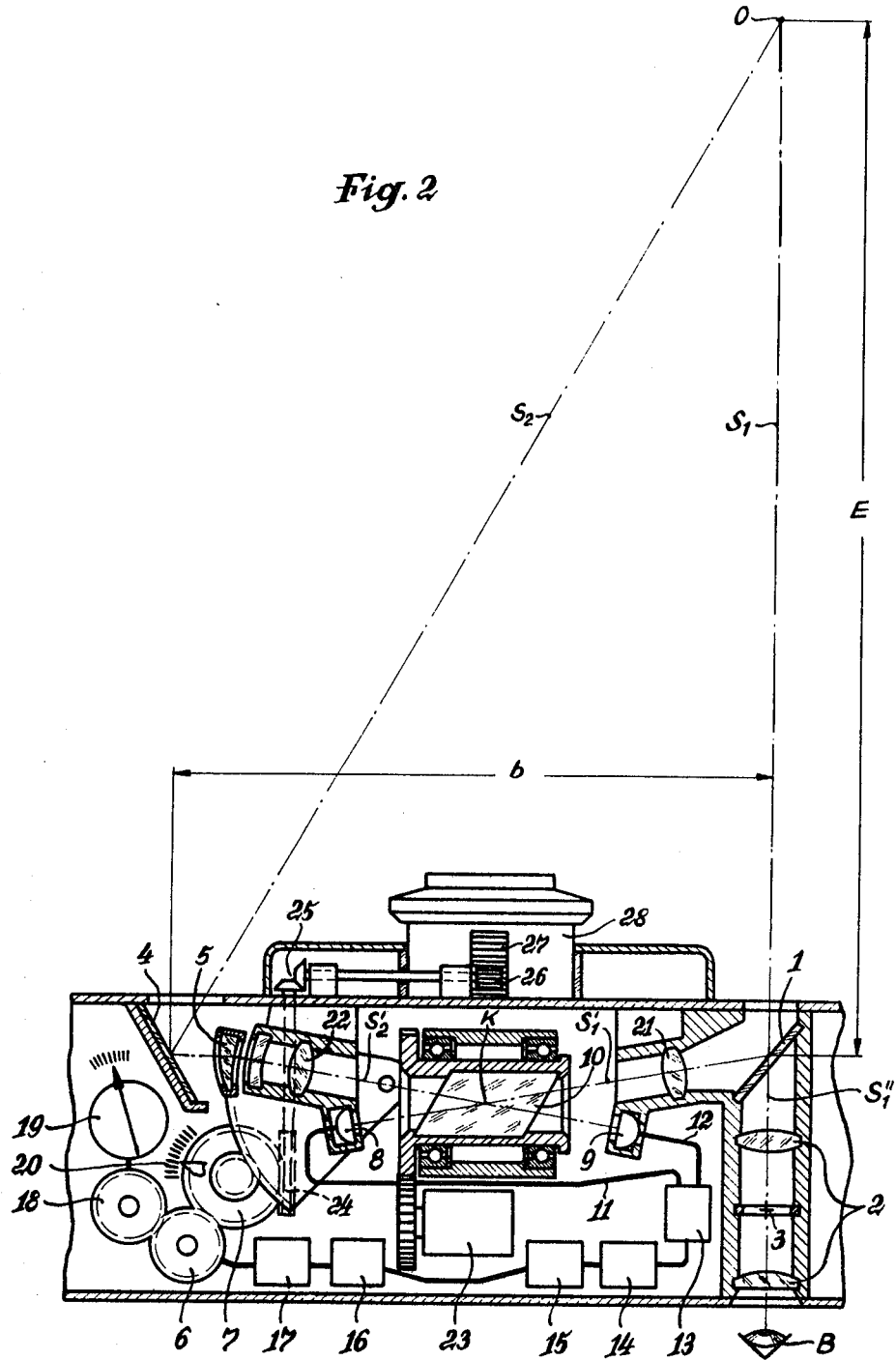

---

3,516,742
METHOD AND APPARATUS FOR FOCUSSING AN OPTICAL DEVICE ON AN OBJECT DISTANT THEREFROM
Dieter Donitz, Braunschweig, Germany, assignor to Voigtlander A.G.
Filed Aug. 31, 1966, Ser. No. 576,356
Claims priority, application Germany, Sept. 24, 1965, V 29,392
Int. Cl. G01c *3/08;* G03b *3/00*
U.S. Cl. 356—4                                9 Claims

ABSTRACT OF THE DISCLOSURE

A method and apparatus for focussing an optical device on an object distant therefrom. A pair of images of the object are respectively directed along different paths which substantially form a well-known range finder triangle. The images are electronically compared, and one of the light paths is automatically deflected with respect to the other until the electronic comparison indicates that there is no difference between the images, so that in this way there is an indication of automatic focussing on the object. The optical structure striates the images so as to lend thereto a considerable contrast even if such contrast is not already present. Moreover, this method and apparatus can be used for automatically focussing an objective of a camera.

---

The present invention relates to optical devices.

In particular, the present invention relates to optical devices which are intended to be sighted upon an object distant from the optical device.

Such devices are used in such a way that they are either focused on the object which is distant from the device or they can be used for measuring the distance between the optical device and the object on which it is sighted. Of course, the device can be used for both purposes.

It is known to provide for the above purposes a pair of images of the object and to compare these images with each other in such a way that it is possible to set the device to indicate the distance between the device and the object as well as to focus the device on the object.

Such a device may conventionally include a pair of optical systems for providing the pair of images, and the image provided by one of the optical systems is adjusted with respect to the other image, manually, until the images achieved from both optical systems are in coincidence. The adjustment of one of the images with respect to the other will indicate on a suitable scale the distance between the sighted object and the optical device, or this adjustment of the images until they are in coincidence can be used directly for setting the objective of the optical device, which may be a camera, for example, so that it is properly focused. The known structure thus requires manual operation and on the other hand its accuracy is limited by reason of the fact that it is difficult for the eye of the operator to determine when both images are precisely in coincidence.

It is therefore a primary object of the present invention to provide a device of the above general type with a method and apparatus which make it possible to greatly increase the accuracy with which the coincidence of the images is determined.

It is furthermore an object of the present invention to provide an automatic arrangement for focusing the optical device on an object distant therefrom. Thus, manual operations will no longer be required with the method and apparatus of the invention and at the same time the accuracy of the setting will be greatly increased.

A further object of the present invention is to provide a method and apparatus which will accurately sense the light distribution of the images even in the case where an image does not have different areas which contrast substantially with respect to each other.

A still further object of the present invention is to provide a method and apparatus which make it possible to determine the speed of movement of an object on which the optical device is sighted.

Furthermore, it is an object of the invention to provide a method and apparatus which make it possible to maintain a synchronous displacement of the light paths for the pair of images so as to maintain the images at a given location during adjustment.

In particular, it is an object of the invention to provide an exceedingly simple single unit which is capable of providing the synchronous displacement of the light paths for the images.

According to the method and apparatus of the present invention, a pair of images of the sighted object are provided along a pair of light paths which intersect at a given point and which extend beyond the latter point, the pair of images being situated at the point where the light paths intersect. Beyond the intersecting point of the light paths the light distributions of the images are sensed, and a pair of photosensitive means may be provided for this purpose. The light distributions are converted into corresponding electrical currents by a suitable electrical means which is operatively connected with the pair of photosensitive means, and in this way the pair of currents can be compared with each other. A deflecting means deflects one of the light paths in advance of the intersecting point between the two light paths, and in this way it is possible to bring the pair of images into coincidence. At the same time a synchronous means is provided at the intersecting point of the light paths for displacing the light paths synchronously with respect to each other so as to maintain the images at the intersecting point simultaneously with the deflection of one of the images relative to the other until the images are brought into coincidence, and in this way it is possible to maintain the pair of photosensitive means stationary. A drive for the deflecting means is controlled by the electrical means and serves to actuate the deflecting means until the images are in coincidence, after which the deflecting means serves to maintain the images in coincidence, and at this time the pair of compared currents are equal to each other so that the drive to the deflecting means will terminate, in the case of a stationary object. Where the object moves the deflecting means will continue to operate so as to maintain the device focused on the moving object, and it is possible to measure the speed of movement of the deflecting means to determine the speed of movement of the object as well as to measure the extent of deflection provided by the deflecting means so as to determine the distance between the optical device and the object on which it is sighted.

The invention is illustrated by way of example in the accompanying drawings which form part of this application and in which:

FIG. 1 is a schematic illustration of one possible embodiment of a method and apparatus according to the invention, the structure being shown in FIG. 1 sighted on an object distant from the device; and FIG. 2 is a partly schematic and partly sectional plan view of a camera which includes the structure shown schematically in FIG. 1.

Referring now to FIG. 1, the structure shown therein serves to determine the distance E between the object O and a measuring device of the invention having an observation point B for the operator. With this device there is a triangular range-finder arrangement having a base $b$ for the triangular measuring system, and a pair of optical systems forming a pair of image-forming means are situated from each other by a distance equal to the length of the base $b$. The first of the image-forming means includes a partly transparent fixed reflector 1 which by way of the light path $S_1$, $S'_1$ directs one image of the object O along the light path indicated in FIG. 1. This image can be sighted by the operator through a sighting device which includes a finder telescope 2 situated behind the partly transparent reflector 1, so that by looking through the viewfinder telescope 2 it is possible for the operator to sight on the object directly through the reflector 1. The finder means 2 is provided with crosshairs 3. This finder means 2 by which the device is sighted on the object is situated directly in front of the observation point B and provides the operator with an image of the object along the light path $S_1$, $S''_1$.

The second optical system which forms the second image-forming means includes a reflector 4 spaced from the reflector 1 by the distance $b$, and this reflector 4 also is stationary. By way of the reflector 4 the image of the object is directed along the second light path $S_2$, $S'_2$.

A deflecting means 5 extends across the part $S'_2$ of the second light path, and this deflecting means 5 can include, for example, a swingable or rotary wedge-shaped element through which the light passes.

A drive means is operatively connected to the deflector means 5 so as to actuate the latter, and for this purpose an electric motor 6 is provided. This electric motor 6 is operatively connected with the deflecting means 5 by way of a transmission 7.

The light paths $S'_1$ and $S'_2$ intersect each other at the point K where both of the images will be situated, and beyond the point K are situated a pair of photosensitive means 8 and 9 intersecting the light paths at locations therealong situated beyond the point K. The pair of photosensitive means 8 and 9 may take the form of photocells or photosensitive resistors.

A synchronous means is provided for maintaining the images at the intersecting point K of the pair of light paths, simultaneously with the deflection of the light path $S'_2$ by the deflecting means 5, and the synchronous means includes a rotary optical unit 10 in the form of a prism, this rotary optical unit 10 rotating as indicated by the arrow P.

The pair of photosensitive means 8 and 9 are electrically connected by way of conductors 11 and 12, respectively, with a known differential forming unit 13 in which the light distributions respectively sensed by the pair of photosensitive means 8 and 9 and converted into corresponding electrical currents are respectively compared with each other. The output of the unit 13 is connected with an amplifier 14 which in turn is connected with an operator or second amplifier 15 and a rectifier 16. Through these electrical components, which form together with a relay unit 17 the electrical means of the invention, it is possible to control the supply of power in the circuit of the motor 6 which drives the deflecting means 5. Thus, the relay unit 17 will control the operation of the electric motor 6 in a known manner.

A tachometer means 18 is operatively connected to the adjusting motor 6 so as to be driven thereby, and this tachometer means 18 includes an indicating structure 19 for indicating the speed of operation of the motor 6 and thus in this way it is possible to indicate the rate with which the deflecting means 5 is actuated. In addition, the drive or transmission 7 is connected with an indicating structure 20 at which it is possible to read off the distance E.

Along the pair of light paths $S_1$, $S'_1$ and $S_2$, $S'_2$ are situated a pair of cylindrical lenses 21 and 22, respectively, which are arranged in such a way that the rotary synchronous means 10 receives striated images having a structure according to which these striations extend transversely to the direction of movement of the images. In other words, the arrangement is such that during turning of the unit 10 the images will be displaced in a direction which is transverse to the direction of the striations thereof.

The above-described structure operates in the following manner:

The object O is sighted through the sighting means 2 with the aid of the crosshairs 3 from the observation point B. The reflector 1 projects an image through the cylindrical lens 21 in striated form onto the photosensitive means 8, while the reflector 4 projects a second image of the object through the cylindrical lens 22 onto the photosensitive means 9. By rotating the unit 10 the pair of striated images are displaced transversely with respect to their striations and of course with respect to the pair of photosensitive means 8 and 9 which respectively sense the light distributions of the images received by the pair of photosensitive means. In the case where the pair of photosensitive means are in the form of photocells, the light distributions are converted into corresponding electrical currents which are compared at the unit 13.

In the usual case the light distribution sensed by the pair of photosensitive means will initially be different, so that different currents are transmitted by the photocells to the unit 13 which will thus respond to the difference between the electrical currents and will actuate the relay 17. A current is therefore transmitted in the circuit of the adjusting motor 6 to the latter so as to actuate the motor which through the transmission 7 drives the deflecting means 5 in an oscillatory manner until the image derived from the reflector 4 and received by the photosensitive means 9 is in coincidence with the image derived from the reflector 1 and received by the photosensitive means 8. At this instant when the two images coincide the pair of currents derived from the pair of photosensitive means are equal, so that the unit 13 will sense no differential between the currents and thus the flow of current to the adjusting motor 6 will be interrupted.

At this time it is possible to read at the indicating means 20 the distance E between the object and the device which is focused thereon.

In the event that the object O moves in the direction of the light path $S_1$, $S''_1$, then the motor 6 will be required to continuously actuate the deflecting means 5. The speed with which the deflecting means 5 is actuated in order to maintain the images in coincidence is determined by the tachometer 18 and is indicated at the speed-indicating part 19 of the tachometer 18 which thus indicates the speed of movement of the object, and this speed of movement can be read from the scale of the indicating part 19 of the tachometer means.

The adjustment of deflecting means 5 can also be used as a parameter for adjusting the objective of a camera which is sighted on the object. In this way it is possible to use the device for automatic focusing of still or motion picture cameras.

The arrangement of the above-described structure in a photographic camera can, for example, take the form shown in FIG. 2 where those parts which correspond to the structure of FIG. 1 are indicated with the same reference characters.

Referring to FIG. 2, it will be seen that the rotary synchronous means 10 is in the form of a prism situated within a tubular housing fixed at one end to a toothed flange and supported for rotary movement by ball bearings. The housing for the prism 10 is rotated by way of a motor 23 which drives a pinion which meshes with the toothed flange fixed to the tube in which the prism 10 is housed. The entire electrical circuitry is turned on and off by a switch, and this latter switch is also used to turn the motor 23 on and off so that the motor 23 operates to rotate the prism 10 continuously, as long as the device is turned on.

With the illustrated camera, the above-described possibility of automatic focusing is achieved. For this purpose the transmission 7 which is operatively connected with the deflecting means 5 includes a worm wheel which meshes with a worm 24 so as to rotate the latter, and this worm 24 is coaxially fixed with a spindle which through the bevel gear drive 25 rotates a pinion 26. This pinion 26 meshes with a rack 27 which is fixed to the axially shiftable objective 28 extending parallel to the optical axis thereof, so that simultaneously with the actuation of the deflecting means 5 the objective 28 is also oscillated until the focusing is automatically achieved in the manner described above. Thus, the objective 28 will oscillate in synchronism with the deflecting means 5 until the flow of current to the motor 6 is interrupted in the manner described above. As is shown in FIG. 2, the deflecting means 5 is connected with a gear sector which meshes with a pinion coaxially fixed to a rotary gear which is driven by the motor 6.

The invention is, of course, not limited to the illustrated details. Thus, instead of providing a single rotary unit 10 it is possible for the synchronous means of the invention to include a pair of rotary units or other adjustable units respectively cooperating with the pair of light paths so as to displace them synchronously in the above-described manner. The relative movement between the light paths and the pair of photosensitive means can also be achieved with stationary light paths in such a way that the synchronous displacement is provided for the photosensitive elements themselves rather than for the light paths. Furthermore, it is possible to provide a construction where the reflector 4 is turnable so that in this way the reflector 4 will form the deflecting means and the deflecting unit 5 can be eliminated.

The pair of cylindrical lenses 21 and 22 which provide the striated structure for the images guarantee an accurate adjustment even in the case where each image does not have areas which contrast greatly with respect to each other. The comparison of the pair of images, and in particular the currents resulting from the light distributions thereof will be more accurate the more distinct the changes in the current. In other words, a sharply contrasting image will provide a greater change in the current into which the image is converted, and with a large current change it is possible to achieve a more accurate comparison between the pair of electrical currents. Thus, the accuracy is determined by the contrast of the images, which is to say the contrast of the light distribution in each image. By utilizing the cylindrical lenses the striated image structure is achieved providing an assured contrast of high degree because of the contrast between the image striations and the lines between these striations. Thus, a high degree of contrast will be provided even with images which in and of themselves do not have a high degree of contrast, and in particular by displacing the images which the synchronous means 10 in a direction transversely to the direction of the striations a very positive sensing of sharp changes in light distribution will be provided at the pair of photosensitive means 8 and 9 to provide a highly accurate operation. Thus, comparison between substantial currents are assured in this way.

While, as has been indicated above, it is possible to provide a pair of movable units for displacing the pair of light paths in synchronism, the use of a single unit at the intersecting point K is of particular advantage because of its simplicity. The use of the difference between the electrical currents in an indirect manner for adjusting the deflecting means 5 is of particular advantage because of the relatively small current intensity achieved from the photo-electric elements 8 and 9.

The finder telescope together with the crosshairs provide an exceedingly accurate sighting of the device on the object.

What is claimed is:

1. In a method of focussing an optical device with respect to an object distant therefrom, the steps of directing a pair of images of the object respectively along a pair of light paths to a pair of given locations, measuring the light-distributions of said images at said locations and converting the light-distributions respectively into a pair of corresponding electrical currents, comparing said currents to each other, deflecting one of said light paths with respect to the other until equal light distributions are measured, thus providing equal electrical currents, synchronously moving said images during deflection of said one light path to scan them at said locations, measuring the extent of deflection of said one light path required to achieve said equal light distributions and utilizing said extent of deflection for adjusting the optical device.

2. In a method as recited in claim 1, providing said images with a striated structure extending transversely with respect to the direction of synchronous movement of said light paths.

3. In an apparatus for focussing an optical device on an object distant therefrom, a pair of image-forming means for respectively forming images of the object along a pair of light paths, a pair of photosensitive means respectively intersecting said light paths to sense the light distributions of said images and convert the light distributions into corresponding electrical currents, respectively, electrical means for comparing said currents, deflecting means coacting with one of said light paths for deflecting said one light path until equal light distributions are sensed by said pair of photosensitive means, to provide equal electrical currents, synchronous means coacting with said light paths for synchronously displacing said light paths to scan said images at said pair of photosensitive means, and electrical drive means driving said deflecting means and controlled by said electrical means for automatically actuating said deflecting means.

4. The combination of claim 3 and wherein said pair of light paths intersect at a given point, said pair of photosensitive means being stationary and situated beyond said point and said synchronous means including a rotary optical unit at said point which turns to achieve a synchronous displacement of said light paths relative to each other for maintaining the images at said pair of photosensitive means.

5. The combination of claim 4 and wherein said unit is a rotary prism.

6. The combination of claim 3 and wherein said drive means includes an electrical adjusting motor and wherein said electrical means includes a relay unit controlling said motor in accordance with the difference between said electrical currents.

7. The combination of claim 3 and wherein a pair of cylindrical lenses are respectively situated along said light paths.

8. The combination of claim 3 and wherein a distance-indicating means coacts with said deflecting means for indicating in accordance with the extent of deflection of said one light path the distance of the object from the device.

9. The combination of claim 3 and wherein a finder means coacts with the other of said light paths for providing the operator with a view of the object, said finder means enabling the operator to sight the device on the object, and said finder means including crosshairs.

References Cited
UNITED STATES PATENTS 2,831,057    4/1958    Orthuber.
3,035,176    5/1962    Kis et al.
3,041,459    6/1962    Greene.

RONALD L. WIBERT, Primary Examiner

V. P. McGRAW, Assistant Examiner

U.S. Cl. X.R.

95—44; 250—204; 356—122